(12) United States Patent
Aaron et al.

(10) Patent No.: US 9,279,619 B2
(45) Date of Patent: Mar. 8, 2016

(54) COOLING TOWER WITH INDIRECT HEAT EXCHANGER

(71) Applicant: Baltimore Aircoil Company, Inc., Jessup, MD (US)

(72) Inventors: David Andrew Aaron, Reisterstown, MD (US); Zan Liu, Clarksville, MD (US); Branislav Korenic, Columbia, MD (US); John Edward Rule, Mooney Mooney (AU); Preston Blay, Silver Spring, MD (US); Philip S. Hollander, Silver Spring, MD (US); Glenn David Comisac, Catonsville, MD (US); Gregory Michael Lowman, Chester, MD (US)

(73) Assignee: Baltimore Aircoil Company Inc., Jessup, MD (US)

( * ) Notice: Subject to any disclaimer, the term of this patent is extended or adjusted under 35 U.S.C. 154(b) by 274 days.

(21) Appl. No.: 13/833,971

(22) Filed: Mar. 15, 2013

(65) Prior Publication Data
US 2014/0264974 A1    Sep. 18, 2014

(51) Int. Cl.
*B01F 3/04*     (2006.01)
*F28C 1/14*     (2006.01)
*F28D 7/08*     (2006.01)

(52) U.S. Cl.
CPC .. *F28C 1/14* (2013.01); *F28D 7/087* (2013.01)

(58) Field of Classification Search
CPC .............. F28C 1/14; F28C 1/02; F28D 7/087; F28D 5/02
USPC .................. 261/128, 147, 155, 158, 159, 160
See application file for complete search history.

(56) References Cited

U.S. PATENT DOCUMENTS

| | | | |
|---|---|---|---|
| 1,844,850 A * | 2/1932 | Harmon | 261/160 |
| 3,012,416 A | 12/1961 | Dart, et al. | |
| 4,366,106 A | 12/1982 | Benyak et al. | |
| 4,434,112 A | 2/1984 | Pollock | |
| 5,435,382 A | 7/1995 | Carter | |
| 5,724,828 A | 3/1998 | Korenic | |
| 5,816,318 A | 10/1998 | Carter | |
| 6,598,862 B2 | 7/2003 | Merrill et al. | |
| 6,702,004 B2 | 3/2004 | Stratman et al. | |
| 6,883,595 B2 | 4/2005 | Stratman et al. | |
| 7,484,718 B2 | 2/2009 | Facius et al. | |
| 7,815,173 B2 * | 10/2010 | Lin | 261/151 |
| 7,887,030 B2 * | 2/2011 | Hentschel et al. | 261/109 |
| 2014/0264973 A1 * | 9/2014 | Aaron et al. | 261/128 |

OTHER PUBLICATIONS

MESAN USA, MXC Series Closed Circuit Cross Flow Induced Draft, 2012, 6 Pages.
EVAPCO, Inc., Eco-Coolers, 2010, 23 Pages.

* cited by examiner

*Primary Examiner* — Charles Bushey
*Assistant Examiner* — Scott Bushley
(74) *Attorney, Agent, or Firm* — Edward J. Brosius

(57) ABSTRACT

A heat exchange apparatus is provided with an indirect evaporative heat exchange section. The indirect evaporative heat exchange section includes a series of serpentine tubes, and an evaporative liquid is passed downwardly onto the indirect heat exchange section. The evaporative liquid is collected in a sump and then pumped upwardly to be distributed again across the indirect heat exchange section. An improved heat exchange apparatus is provided with a top and a bottom indirect evaporative heat exchange section including a series of serpentine tubes A secondary system to distribute evaporative liquid below the first indirect heat exchange section and a direct heat exchange section may be provided between the two indirect heat exchangers.

5 Claims, 15 Drawing Sheets

COOLING TOWER WITH INDIRECT HEAT EXCHANGER

BACKGROUND OF THE INVENTION

The present invention relates generally to an improved heat exchange apparatus such as a closed circuit fluid cooler, fluid heater, condenser, evaporator, thermal storage system, air cooler or air heater. More specifically, the present invention relates to a combination or combinations of separate indirect and direct evaporative heat exchange sections or components arranged to achieve improved capacity and performance.

The invention includes the use of a coil type heat exchanger as an indirect heat exchange section. Such indirect heat exchange section can be combined with a direct heat exchange section, which usually is comprised of a fill section over which an evaporative liquid such as water is transferred, usually in a downwardly flowing operation. Such combined indirect heat exchange section and direct heat exchange section together provide improved performance as an overall heat exchange apparatus such as a closed circuit fluid cooler, fluid heater, condenser, evaporator, air cooler or air heater.

Part of the improved performance of the indirect heat exchange section comprising a coil type heat exchanger is the capability of the indirect heat exchange section to provide both sensible and latent heat exchange with the evaporative liquid which is streamed or otherwise transported downwardly over and through the indirect heat exchange section. Such indirect heat exchangers are usually comprised of a series of serpentine tube runs with each tube run providing a circuit of a coil. Improved performance of such indirect heat exchangers is achieved by opening the spacing between the generally horizontal tube runs in one or more of the serpentine coil return bends. Such opened spacing in the serpentine coil return bends creates a more efficient cooling zone for the evaporative liquid flowing downwardly over the serpentine coils.

Various combinations of the heat exchange arrangements are possible in accordance with the present invention. Such arrangements could include an arrangement having an indirect heat exchange section with increased vertical spacing in the series of serpentine tube runs formed by increased height return bends. In such an arrangement, an evaporative liquid flows downwardly onto and through the indirect heat exchange section with such evaporative liquid, which is usually water, then exiting the indirect section to be collected in a sump and then pumped upwardly to again be distributed downwardly over the indirect heat exchange section. In this counterflow arrangement, embodiments work more efficiently with generally lower spray flow rates, in the order of 2-4 GPM/sq. ft. In other arrangements presented, the design spray flow rates may be higher.

In another arrangement, a combined heat exchange apparatus is provided with an indirect heat exchange section comprised of serpentine tube runs over which and evaporative liquid is distributed downwardly onto and through the indirect heat exchange section. Such indirect heat exchange section is comprised of serpentine tube runs having an increased spacing between one or more return bends of increased height. Further, a direct heat exchange section comprised of fill can be located in one or more of the areas of increased vertical spacing formed by the return bends of the serpentine coil. In this arrangement, the embodiments work more efficiently with generally lower spray flow rates, in the order of 2-4 GPM/sq. ft. So not only are the embodiments presented within more efficient providing increased heat rejection but they also do it with less energy requirement for the spray water pump. In other arrangements presented, the design spray flow rates may be higher.

Further, it is also part of the present invention to provide a second, intermediate spray water distribution arrangement whereby the evaporative liquid is distributed downwardly over the indirect and, if present, the direct heat exchange sections, at a point below the top of the indirect heat exchange section For this arrangement, there are several different modes of operation which further improve the heat transfer capabilities and customer benefits. In one mode of operation, both the top and intermediate spray sections are active and spray water onto the indirect and direct sections is present. In another mode of operation, the intermediate spray section is not active and the top spray arrangement provides the evaporative liquid to the entire assembly. In yet another mode of operation, the top spray section is not active and the intermediate spray section is active which can provide evaporative cooling for the lower coil section while providing dry sensible cooling for the dry upper coil section. In yet another mode of operation, the top spray section is not active, the intermediate spray section is active, there is selectively no heat transfer from the lower coil section beneath the intermediate spray section allowing the upwardly flowing air to become adiabatically saturated through the direct section if present before transferring sensible heat with the top portion of the coil above the intermediate spray section. This last mode of operation further reduces the amount of water use while providing lower temperature air to provide sensible cooling to the top portion of the coil above the intermediate spray arrangement.

The heat exchanger apparatus or fluid cooler of the present invention could be operated wherein both air and an evaporative liquid such as water are drawn or supplied across both the indirect and direct heat exchange section if present. It may be desirable to operate the heat exchanger without a supply of the evaporative liquid, wherein air only would be drawn across the indirect heat exchange section and across a direct section if present. It is also possible to operate a combined heat exchanger in accordance with the present invention wherein only evaporative liquid would be supplied across or downwardly through the indirect heat exchange section and the direct heat exchange section if present, and wherein air would not be drawn by typical means such as a fan.

In the operation of an indirect heat exchange section, a fluid stream passing through the serpentine coils is cooled, heated, condensed, or evaporated in either or both a sensible heat exchange operation and a latent heat exchange operation by passing an evaporative liquid such as water together with air over the serpentine coils of the indirect heat exchange section. Such combined heat exchange results in a more efficient operation of the indirect heat exchange section, as does the presence of the increased spacing formed in one or more of the return bends of the serpentine tube runs of the indirect heat exchange section. Further efficiency in operation can also be achieved by the provision of a second or intermediate spray distribution system for providing evaporative liquid to flow downwardly onto and through the serpentine coils of the indirect heat exchange section. The evaporative liquid, which again is usually water, which passes generally downwardly through the indirect heat exchange section and generally downwardly through the direct heat exchange section which is typically a fill assembly, if such a direct heat exchange section is provided in the increased vertical spacing in one or more of the increased height return bends of the serpentine coils of the indirect heat exchange section. Heat in the evaporative liquid is passed to air which is drawn generally passing downwardly or upwardly through the indirect heat exchange section and outwardly from the closed circuit fluid cooler or heat exchanger assembly by an air moving system such as a fan. The evaporative liquid draining from the indirect or direct heat exchange section is typically collected in a sump and then pumped upwardly for redistribution across the indirect or direct evaporative heat exchange section.

The type of fan system whether induced or forced draft, belt drive, gear drive or direct drive can be used with all embodiments presented. The type of fan whether axial, centrifugal or other can be used with all embodiments presented. The type of tubes, material of tubes, tube diameters, tube shape, whether finned or un-finned, the number of tube passes, number of return bends, number of increased vertical spaces, can be used with all embodiments presented. Further, the coil may consist of tubes or may be a plate fin type or may be any type of plates in any material which can be used with all embodiments presented within. The type of fill, whether efficient counterflow fill, contaminated water application fills or any material fill can be used with all embodiments presented.

Accordingly, it is an object of the present invention to provide an improved heat exchange apparatus, which could be a closed circuit fluid cooler, fluid heater, condenser, evaporator, air cooler or air heater, which includes an indirect heat exchange section with increased spacing formed in one or more return bends of the serpentine tube forming the indirect heat exchange section.

It is another object of the present invention to provide an improved heat exchange apparatus such as a closed circuit fluid cooler, fluid heater, condenser, evaporator, air cooler or air heater, including an indirect heat exchange section that comprises a series of serpentine tube runs with increased vertical spacing between one or more of the tube runs and with a direct heat exchange located in one or more of the areas of increased vertical spacing.

It is another object of the invention to provide an improved heat exchange apparatus comprising an indirect heat exchange section comprised of serpentine coils with both a primary evaporative liquid distribution system at or near the top of the serpentine coils and a secondary evaporative liquid distribution system located below the top of the serpentine coils. Further the primary and secondary evaporative liquid distribution systems may be selectively operated such that water may be preserved.

It is another object of the present invention to provide an improved evaporative heat exchange apparatus such as a closed circuit fluid cooler, fluid heater, condenser, evaporator, air cooler or air heater, including at least two indirect heat exchange sections that comprise a series of serpentine tube runs with increased vertical spacing between one or more tube runs and with a direct heat exchange located in one or more of the areas of increased vertical spacing between tube runs.

It is another object of the present invention to provide an improved evaporative heat exchange apparatus such as a closed circuit fluid cooler, fluid heater, condenser, evaporator, air cooler or air heater, including at least two indirect heat exchange sections separated by an increased vertical spacing with an optional direct heat exchange located in the increased vertical space between indirect heat exchange sections.

It is another object of the present invention to provide an improved evaporative heat exchange apparatus such as a closed circuit fluid cooler, fluid heater, condenser, evaporator, air cooler or air heater, where direct heat exchange sections located in one or more of the areas of increased vertical spacing between tube runs or alternatively located between increased vertical space between indirect heat exchange sections are easily accessible and replaceable for serviceability.

SUMMARY OF THE INVENTION

The present invention provides an improved heat exchange apparatus which typically is comprised of an indirect heat exchange section. The indirect heat exchange section provides improved performance by utilizing a serpentine coil arrangement comprised of tube run sections and return bends, with a means of increasing the distance between one or more of the tube runs of the serpentine coils. One way to accomplish this vertical separation between the generally horizontal or sloped tube runs is by increasing one or more of the return bend radius in the return bends of the serpentine tube runs in the serpentine coil. Another way to accomplish this vertical separation between generally horizontal or sloped tube runs is to install a purposeful vertical spacing between two or more serpentine coils or other indirect heat exchange sections such as plate heat exchangers. The tube run sections of the serpentine coil arrangement may be generally horizontal and can be slanted downwardly from the inlet end of the coils toward the outlet end of the coils to improve flow of the fluid stream there through. Such serpentine coils are designed to allow a fluid stream to be passed there through, exposing the fluid stream indirectly to air or an evaporative liquid such as water, or a combination of air and an evaporative liquid, to provide both sensible and latent heat exchange from the outside surfaces of the serpentine coils of the indirect heat exchanger. Such utilization of an indirect heat exchanger in the closed circuit fluid cooler, fluid heater, condenser, evaporator, air cooler or air heater of the present invention provides improved performance and also allows for combined operation or alternative operation wherein only air or only an evaporative liquid or a combination of the two can be passed through or across the outside of the serpentine coils of the indirect heat exchanger.

A direct heat exchange section or sections can be located generally within the indirect heat exchange section in the vertical spacing between the increased height return bends of the generally horizontal tube runs of the serpentine coil. Accordingly, the evaporative liquid is allowed to pass across and through the indirect and direct sections comprising the heat exchange section. Heat is drawn from such evaporative liquid by a passage of air across or through the indirect and direct heat exchange sections by air moving apparatus such as a fan. Such evaporative liquid is collected in a sump in the bottom of closed circuit fluid cooler, fluid heater, condenser, evaporator, air cooler or air heater and pumped back for distribution, usually downwardly, across or through the indirect heat exchange section. Further a secondary evaporative liquid distribution system may located below the top of the indirect serpentine coils within the indirect heat exchange section or between two indirect sections in the vertical spacing and selectively operated with the primary evaporative liquid distribution system such that water may be conserved.

DESCRIPTION OF THE PREFERRED EMBODIMENT

Figure 1:
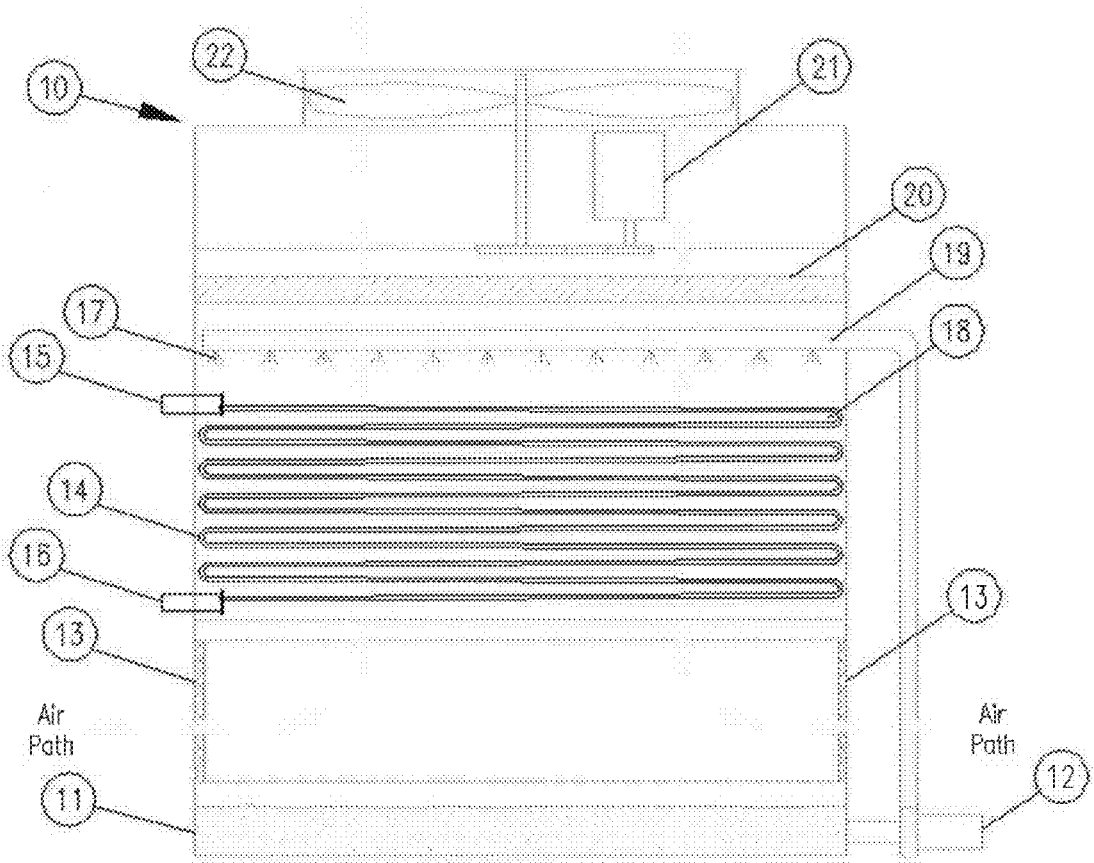
FIG. 1 is a side view of a prior art indirect heat exchanger including a series of serpentine tube runs.

Referring now to FIG. 1, a prior art evaporatively cooled coil product 10 which could be a closed circuit cooling tower or an evaporative condenser. Both of these products are well known and can operate wet in the evaporative mode or can operate dry, with the spray pump 12 turned off when ambient conditions or lower loads permit. Pump 12 receives the coldest cooled evaporatively sprayed fluid, usually water, from cold water sump 11 and pumps it to spray water header 19 where the water comes out of nozzles or orifices 17 to distribute water over coil 14. Spray water header 19 and nozzles 17 serve to evenly distribute the water over the top of the coil(s) 14. As the coldest water is distributed over the top of coil 14, motor 21 spins fan 22 which induces or pulls ambient air in through inlet louvers 13, up through coil 14, then through drift eliminators 20 which serve to prevent drift from leaving the unit, and then the warmed air is blown to the environment. The air generally flowing in a counterflow direction to the falling spray water. Although FIG. 1 and all following Figures are shown with axial fan 22 inducing or pulling air through the unit, the actual fan system may be any style fan system that moves air through the unit including but not limited to induced and forced draft. Additionally, motor 21 may be belt drive as shown, gear drive or directly connected to the fan. It should be understood that in all the embodiments presented, there are many circuits in parallel with tube runs but only the outside circuit is shown for clarity. Coil 14 is shown with an inlet header 15 and outlet header 16 which connects to all the serpentine tubes having normal height return bend sections 18. It should be further understood that the number of circuits within a serpentine coil is not a limitation to embodiments presented.

Figure 2:
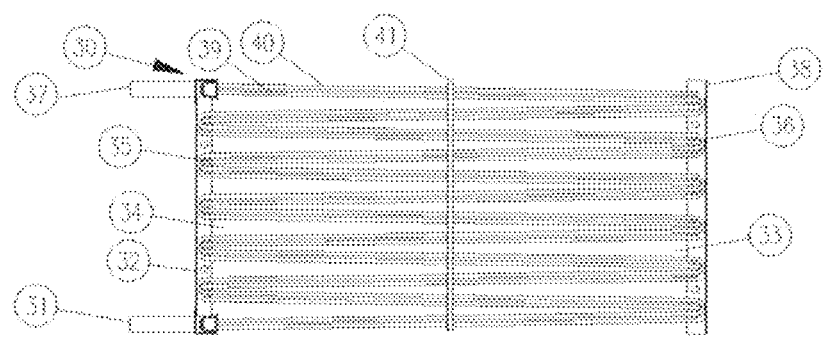
FIG. 2 is a side view of a prior art indirect heat exchanger serpentine coil.

Referring now to FIG. 2, prior art coil 30 has inlet and outlet headers 37 and 31 respectively, is supported by coil clips 32 and 38 with center support 41. There are two circuits coming out of the inlet header shown as generally horizontal tube runs 39 and 40. Coil 30 is built with short radius or normal return bends 36 with a small slope to allow for proper drainage. In some prior art coils, this slope of the generally horizontal tube runs can vary with the last set of tube runs on the bottom having more slope. The spacing 35 between tube runs on the left side can be seen as nearly zero and accordingly allows very little interaction between the falling spray water and generally counter flowing air before the spray water hits the next set of tube runs. Similarly, the larger space 33 and 34 between generally horizontal tube runs is seen as little larger but still there is insufficient interaction between the failing spray water and generally counter flowing air before the spray water hits the next set of tube runs compared to the embodiments presented within. In addition, there is not enough room in gaps 33, 34 or 35 to install a direct heat exchange section such as counterflow fill or to install an intermediate spray system to further increase the spray water cooling such as the embodiments presented within.

Figure 3:
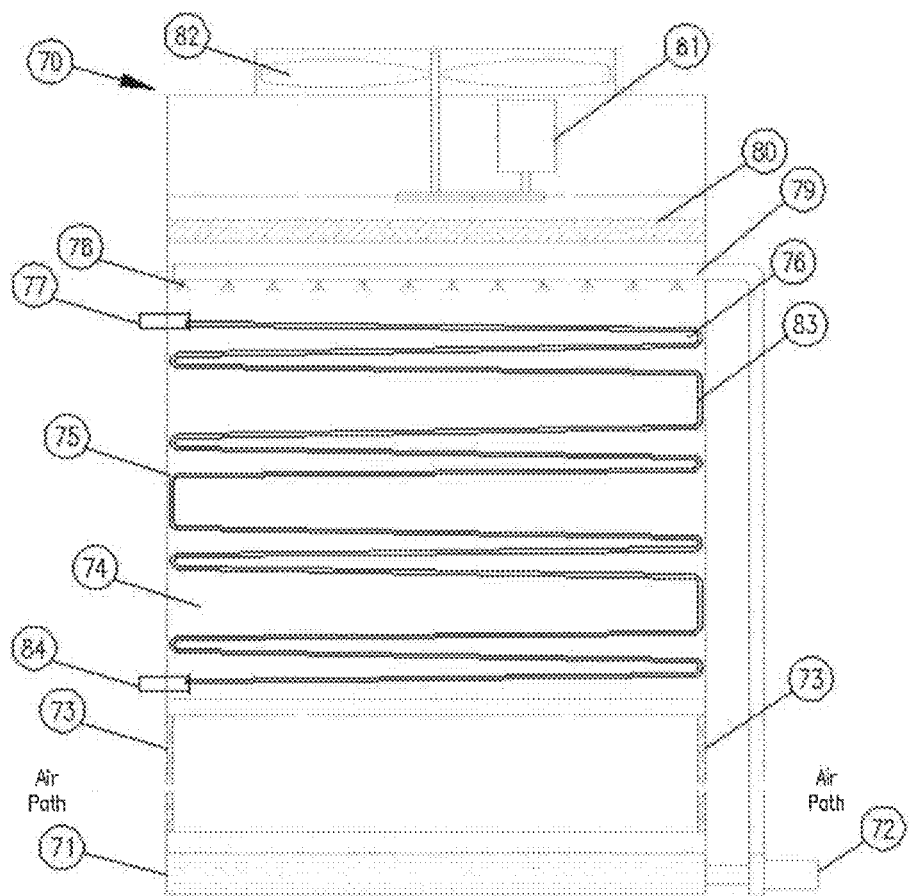
FIG. 3 is a side view of a first embodiment of an indirect heat exchanger with a series of serpentine slanted tube runs in accordance with the present invention.

Referring to FIG. 3, a cooling tower in accordance with the first embodiment of the invention is shown at 70 with the coolest spray water being pumped from cold water sump 71 by pump 72 to spray header arrangement 79 with nozzles or orifices 78 to uniformly distribute water over coil 75. Motor 81 operates fan 82 to induce air first through inlet louvers 73, generally upwards through coil 75 then through eliminators 80 then dispelling it to the environment. First embodiment coil 75 has an alternating combination of tight return bends 76 and wide radius return bend 83 in serpentine coil 75. The substantially wide return bend 83 forms a spray water cooling zone 74 where the spray water is additionally cooled by the up flowing air before it contacts the next set of tube runs having tight or normal return bends 76. In this embodiment, coil 75 has four sets of three tight or normal return bend radius rows 76 separated by three intentionally large return bends 83 forming three large spray water cooling zones 74 within coil assembly 75. Coil 75 is shown with inlet header 77 and outlet header 84 which connects to all the serpentine tubes. It should be noted in this and all other embodiments that the inlet header 77 and outlet header 84 may be reversed depending on the particular application and is not a limitation of the invention. The first embodiment is shown with the generally horizontal tube runs having a slight pitch or slope from one end to the other to allow the coils to drain better and aids condensers so the liquid condensate can drain easier. It should be noted that for the sake of simplicity, all further embodiments are shown without tube pitch but it must be understood that tubes may be sloped or not. The first embodiment shows twelve generally horizontal tube runs or as commonly called passes however, other embodiments can employ any number of tube runs or passes and is not a limitation of the invention. Once the spray water leaves the bottom of coil 75 there is additional spray water cooling before the spray water cascades down to cold water basin 71. Substantial space 74 between tight return bend tube rows 76 allows the spray water droplets to be cooled by the counter-flowing air before picking up more heat from next set of tube runs. The height of spray water cooling zone 74 should be at least one inch. Users in the art will recognize that the number of tube run or passes, number of spray water cooling zones 74, and the height of the spray water cooling zone 74 can be optimized to achieve desired performance and overall height of embodiment 70. Further the tubes may be of any diameter or shape and are not a limitation of the invention.

Figure 4:
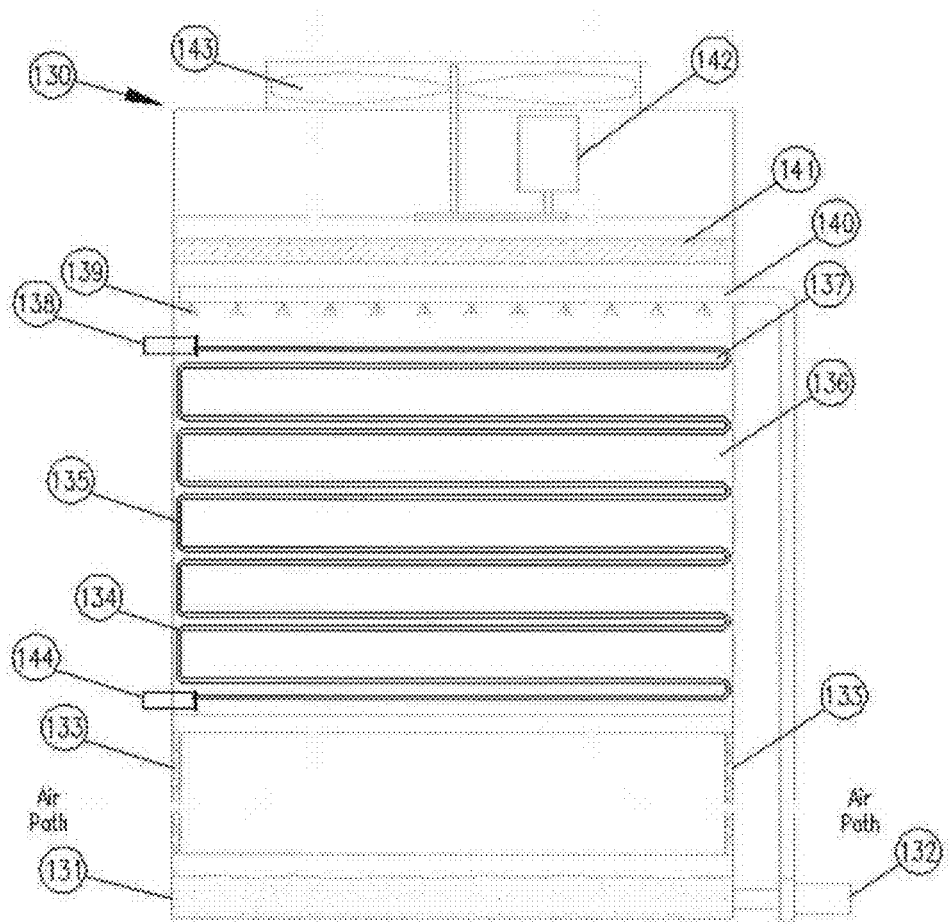
FIG. 4 is a side view of a second embodiment of an indirect heat exchanger with a series of serpentine tube runs in accordance with the present invention.

Referring now to FIG. 4, a cooling tower in accordance with a second embodiment 130 is shown. The components in second embodiment 130 including cold water basin 131, pump 132, inlet louvers 133, spray arrangement 140 nozzles or orifices 139, inlet header 138, outlet header 144, drift eliminators 141, motor 142 and fan 143 are shown as identical and function the same as that presented in the first embodiment. Coil 134 in the second embodiment has been changed to illustrate the variation that users in the art may take to optimize performance and height. In coil 134, there are still twelve generally horizontal tube runs as in the first embodiment but coil 134 now has six sets of two, tight or normal return bend 137, tube runs separated by five large spray water cooling zones 136 formed by large return bends 135. It should be noted that the tube runs in coil 134 are shown as horizontal for clarity but can be sloped or slanted as shown in the first embodiment. In this and all future embodiments, the generally horizontal tube runs are shown as horizontal for clarity yet they may be slanted or sloped. The second embodiment shows a variation on the first embodiment and it should be noted that the number of tube runs between large spray water cooling zones, the number of large spray water cooling zones, number of total tube runs, the height of large spray water cooling zone can all be varied to optimize performance and unit height.

Figure 5:
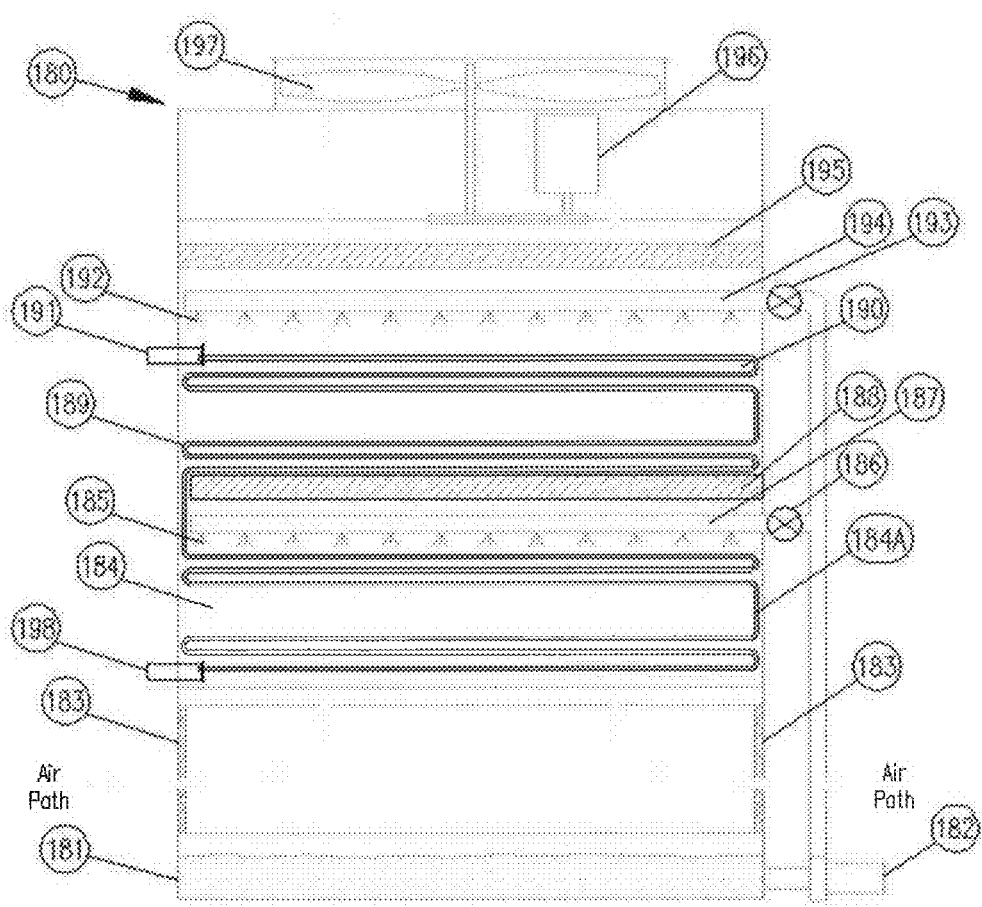
FIG. 5 is a side view of a third embodiment of an indirect heat exchanger with secondary evaporative liquid distribution in accordance with the present invention.

Referring to FIG. 5, a cooling tower in accordance with third embodiment is shown at 180. The components in third embodiment 180 including cold water basin 181, pump 182, inlet louvers 183, primary spray arrangement 194, nozzles or orifices 192, inlet header 191, outlet header 198, drift eliminators 195, motor 196 and fan 197 all function the same as that presented in the first embodiment. Coil 189 has normal height return bends 190 and increased height return bends 184A. Within large spray water cooling zone 184, third embodiment 180 also contains secondary or intermediate spray header 187 with nozzles or orifices 185 to evenly spray coil 189 with additional spray water, drift eliminators 188, and selectively operated valves 193 and 186. It should be noted that instead of valves 193 and 186, two spray pumps may be used to accomplish the same desired modes of operation. It should also be noted that the two shown large spray water cooling zones 184 formed by large return bends 184A may also have a direct section if desired. There are four main modes of operation with embodiment 3. The first mode of operation is with spray pump 182 on, with valves 186 and 193 open, water is sprayed over the top of coil 189 and also within coil 189. The spray flow variation and larger total spray flow on the bottom section of coil 189 causes unit 180 to operate more efficiently. During mode one, the fan can operate at any speed desired or can be off. For the second mode of operation, valve 193 can be closed allowing only spray water to flow over the bottom section of coil 189. In this hybrid mode, the bottom part of coil 189 operates in the evaporatively cooled mode while the top section of coil 189 above drift eliminators 188 operates dry. This mode of operation can serve to save water and also abate plume if desired. During mode two, the fan can operate at any speed desired or can be off. The third mode of operation can by turning spray pump 182 off such that only sensible cooling of coil 189 is accomplished.

Figure 6:
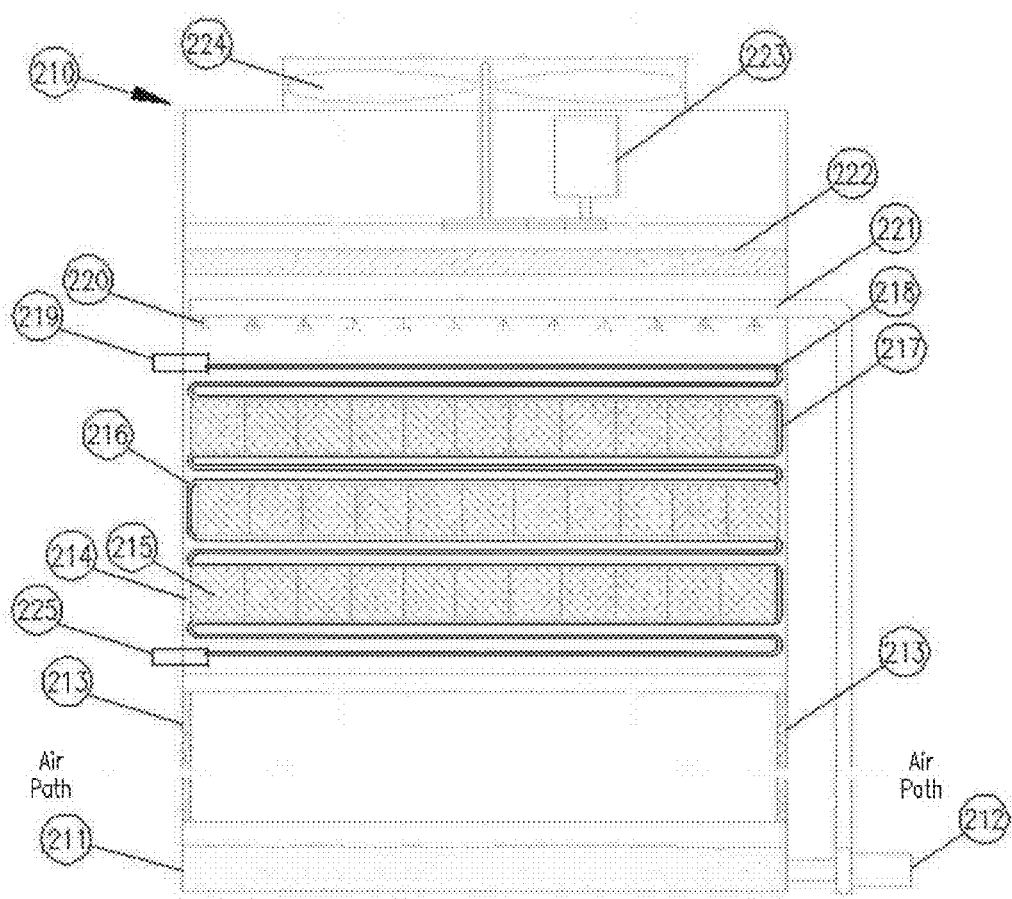
FIG. 6 is a side view of a fourth embodiment of an indirect heat exchanger with direct heat exchange sections in accordance with the present invention.

Referring now to FIG. 6, a cooling tower in accordance with a fourth embodiment is shown at 210. The components in fourth embodiment 210 including cold water basin 211, pump 212, inlet louvers 213, spray arrangement 221, nozzles or orifices 220, inlet header 219, outlet header 225, drift eliminators 222, motor 223 and fan 224 function the same as that presented in the first embodiment. Note there are alternating tight or normal return bends 218 and then larger return bends 217 forming large spray water cooling zone 214 in coil 216. In this preferred embodiment, there is at least one direct heat exchange section. Direct heat exchange section 215 can be counterflow fill which is installed inside the large spray water cooling zone 214. Direct section 215 increases the efficiency of the cooling of the spray water within the large spray water cooling section 214. In this embodiment, there are repeating sets of four tube runs or passes with tight radius or normal return bends 218 following each by three large radius bends 217 forming three large spray water cooling zones 214 to exist within the confines of the coil. In this case, up to three direct sections can be used if desired and as shown. The efficiency gained in further cooling the spray water between the tubes 214 far exceeded the loss of airflow from the added direct sections or fill decks 215 to apparatus 210. The type of direct section can be counterflow fill, contaminated water fill or any substrate that increases the surface area of the spray water within the large spray water cooling zone. In coil 216, there are still twelve generally horizontal tube runs as in the first embodiment but coil 216 now has four sets of three tight return bend 218 tube runs separated by three large spray water cooling zones 214. It should be noted that the tube runs in coil 216 are shown as horizontal for clarity but can be sloped or slanted as shown in the first embodiment. It should be noted that the number of tube runs between large spray water cooling zones, the number of large spray water cooling zones, number of total tube runs, the height of large spray water cooling zone can all be varied to optimize performance and unit height. Further it should be noted that one may use any means for supporting the direct sections within the large spray water cooling zones in indirect coil 216 within spray water cooling zone 214. One such support means would be to rest the direct section 215 onto indirect tube runs in coil 216. Another such method would be for the direct section to be placed on top of small rods that are installed on the tube runs of indirect section 216 such that the direct section does not directly come in contact with the indirect section. Another such method would be for the direct section to be supported from a frame structure such that the direct section does note direct come in contact with the indirect section.

Figure 7:
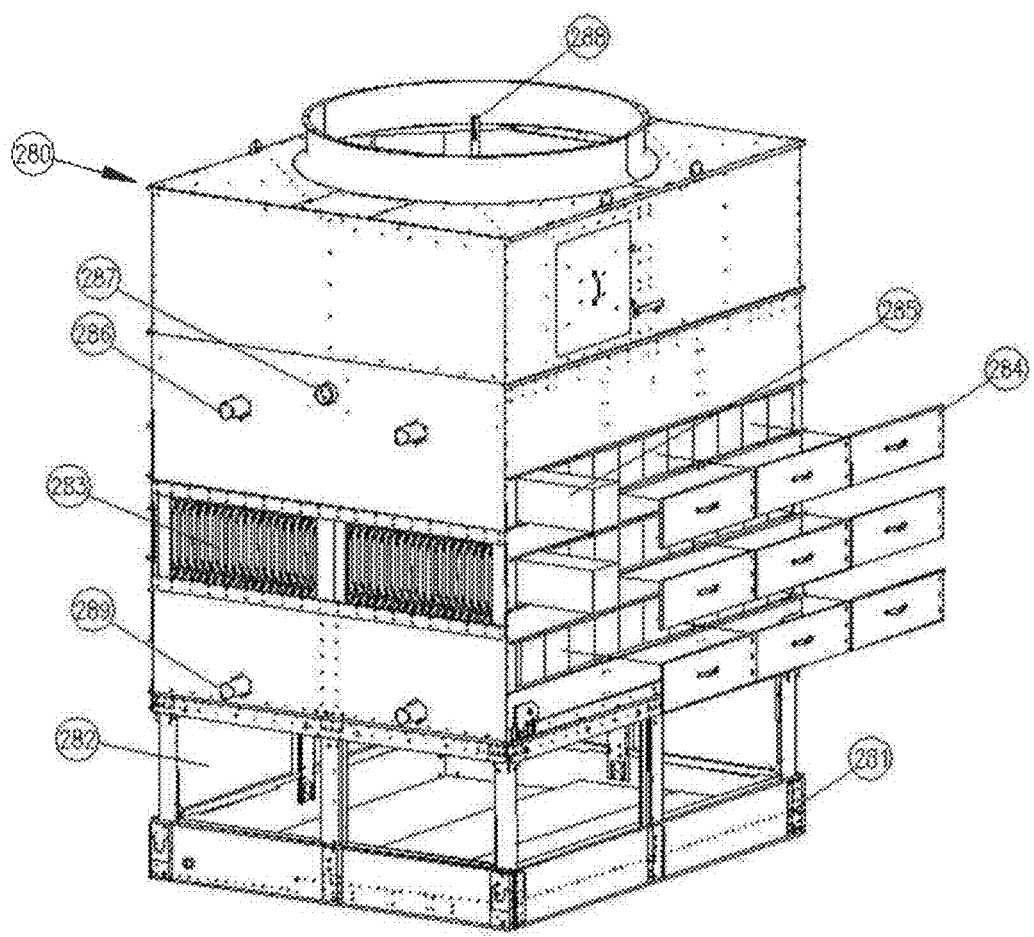
FIG. 7 is a perspective view of the fourth embodiment of a closed circuit cooling tower with an indirect heat exchange section with direct heat exchange sections in accordance with the present invention.

FIG. 7 is a perspective view of a cooling tower 280 in accordance with the fourth embodiment. More specifically, the cutaway views show that direct sections 285 may be easily removed for cleaning and replacement by opening or removing panels 284. Removal of panels 284 allows access to clean indirect heat exchanger 283 as well. It should be noted that panels 284 could be connected to selectively partially open during operation to act as fresh air inlets. In embodiment 280, indirect coil 283 is shown with panels 284 removed for clarity where the large spray water cooling zones are located. A means for supporting the direct sections within the large spray water cooling zones in indirect coil 283 can be the direct section 285 resting on the indirect section, or sitting on small rods that are installed on top of indirect section 283 or any means to hang the direct section without it touching the indirect section if desired. The means to install the direct section within the large spray cooling zone is not a limitation. Spray water inlet 287 serves to distribute the spray water uniformly to the top of coil 283. Air inlet 282 is shown without the inlet louvers installed so the inside of cold water basin 281 can be seen. Coil inlet 286 and outlet 289 are shown for connection for the incoming fluid to be cooled or condensed. Fan shaft 288, is connected to the fan and motor (shown) and the fan system pulls air though the air inlet 282 through indirect coil 283 and direct sections 285 through the drift eliminators (not shown) and then generally upwards to the environment.

Figure 8:
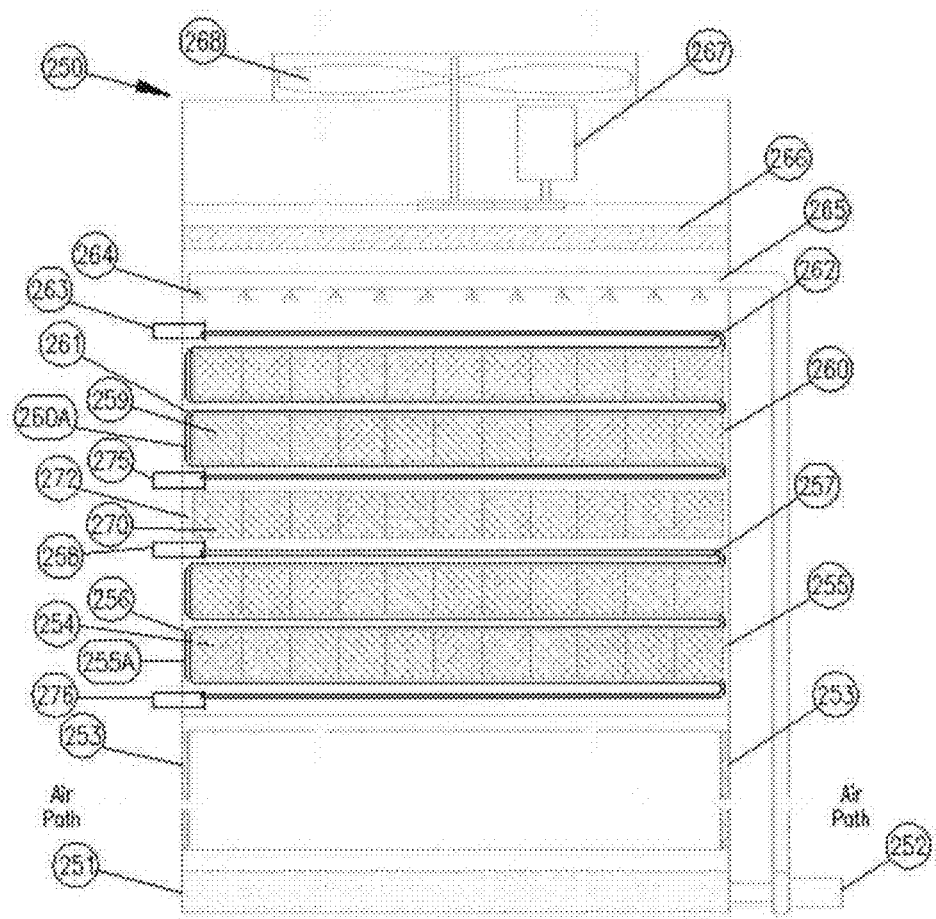
FIG. 8 is a side view of a fifth embodiment of two indirect heat exchanger sections with five direct heat exchange sections in accordance with the present invention.

Referring now to FIG. 8, a cooling tower in accordance with a fifth embodiment is shown at 250. The components in the fifth embodiment 250 including cold water basin 251, pump 252, inlet louvers 253, spray arrangement 265, nozzles or orifices 264, inlet header 263, outlet header 275, drift eliminators 266, motor 267 and fan 268 function the same as that presented in the first embodiment. Fifth embodiment 250 utilizes at least two separate coils 261 and 256. Coil 261 has inlet and outlet headers 263 and 275 respectively while coil 256 has inlet and outlet headers 258 and 276 respectively. Coil 261 and coil 256 may be piped in a series or in a parallel arrangement as desired. Coil 261 and coil 256 are shown with three sets of two tube runs with tight return bend 262 and 257 and both with two large spray water cooling zones 260 and 255 formed by large return bends 260A and 255A, respectively. It should be noted that coils 261 and 256 are separated by a large spray water cooling zone 272 and this zone has optionally a direct heat exchanger 270 installed within it. It should be understood that in all large spray water cooling zones 260, 272 and 255, users in the art may have empty space, an intermediate spray arrangement or direct heat exchange 259, 270 and 254 respectively installed as shown. It should be understood that the main feature in embodiment 250 is that it utilizes more than one coil compared to prior embodiments which may be used for further optimization and manufacturing reasons.

Figure 9:
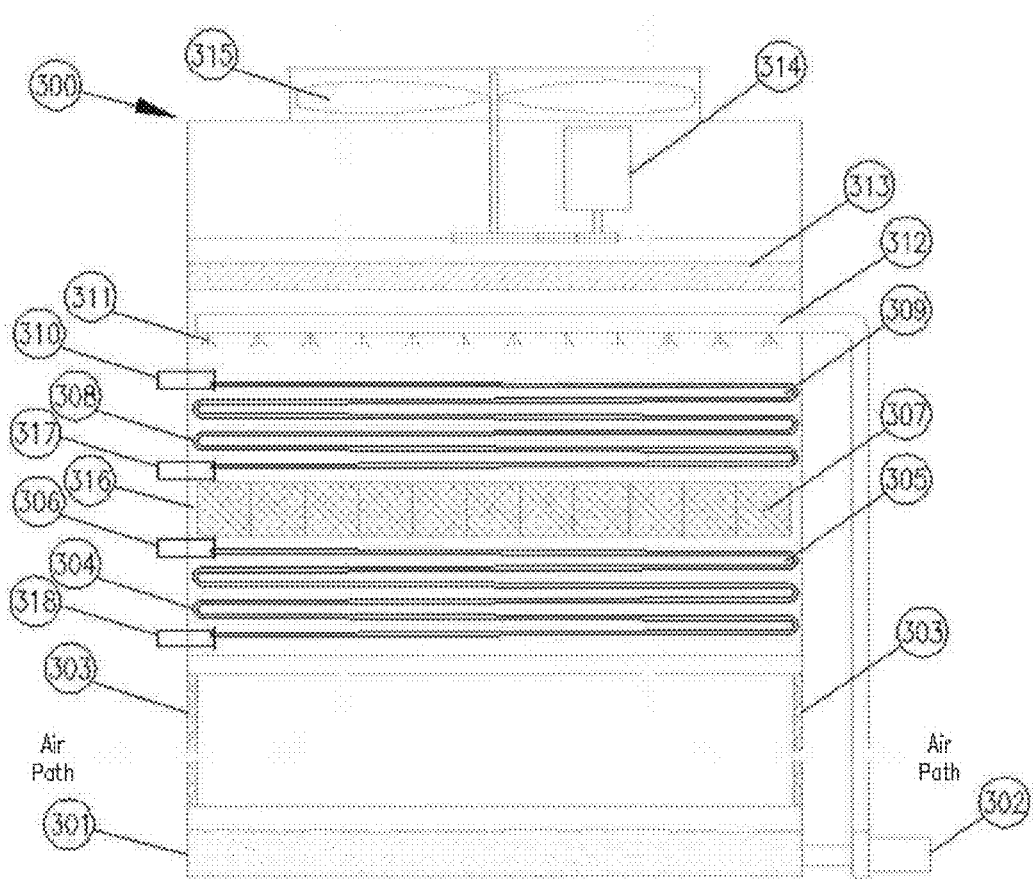
FIG. 9 is a side view of a sixth embodiment of two indirect heat exchangers with one direct at exchange section in accordance with the present invention.

Referring now to FIG. 9, a cooling tower in accordance with sixth embodiment is shown at 300. The components in the sixth embodiment including cold water basin 301, pump 302, inlet louvers 303, spray arrangement 312, nozzles or orifices 311, eliminators 313, motor 314 and fan 315 function the same as that presented in the first embodiment. Sixth embodiment 300 also utilizes at least two separate indirect heat exchange coils shown as 308 and 304 having inlet headers 310 and 306, respectively and outlet headers 317 and 318, respectively. Coil 308 and coil 304 may be piped in a series or in a parallel arrangement or even with different fluids as is well known in the art. Coil 308 and coil 304 are shown with six sets of two tube runs with tight or normal return bends 309 and 305 respectively and both coils do not have within them a large spray water cooling zone. However coils 308 and 304 are separated by a large spray water cooling zone 316 and this zone has optionally a direct heat exchanger 307 installed within it. It should be understood that in all large spray water cooling zones 316 may have empty space for extra spray water cooling, an intermediate spray arrangement or direct heat exchange installed shown as 307. Both embodiments 250 and 300 have at least two indirect heat exchangers. It should be understood that embodiment 250 utilizes more than one indirect heat exchanger or coil and that each coil has large spray water cooling zone within the coil while embodiment 300 has at least two indirect heat exchangers with no large spray water zones within the coil but the vertical separation between coils forms the large spray water cooling zone. It should be noted that any number of tube runs per coil section can be used, any number indirect coil sections may be used and any height of spray water cooling zone between the indirect section coils can be used is not a limitation to the invention. One of the coils shown in embodiment 300 can also be made with large spray water cooling zones within the coils.

Figure 10:
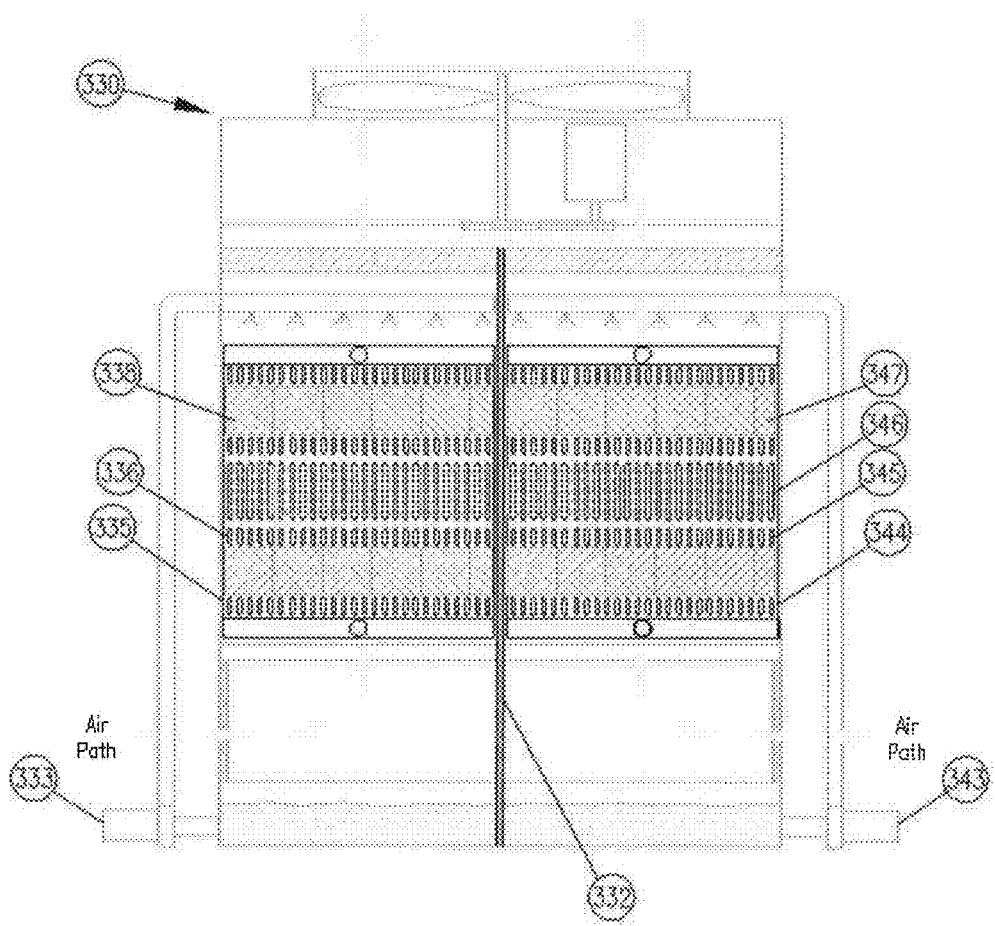
FIG. 10 is an end view of a seventh embodiment of two indirect heat exchangers with direct heat exchange sections in accordance with the present invention.

Referring now to FIG. 10, a cooling tower in accordance with seventh embodiment is presented at 330. This embodiment has all the same features as previous Figures describe but it should be noted that the embodiment has been rotated to show divider wall 332 and pump 333 and 343 more clearly. In this embodiment, there are substantially wide return bends 346 forming a spray water cooling zone 347 where the spray water is additionally cooled by the generally up flowing air before it contacts the next set of tube runs having tight or normal return bends 345. In this embodiment there are four sets of three tight return bend radius rows 345 separated by three intentionally large return bends 346 forming three large spray water cooling zones 338 within coil assemblies 336 and 345. In this water savings embodiment, left coil 335 and right coil 344 can be bare tubes of any tube diameter or any tube shape, be spirally finned, plate finned or be plate coils. Coils 335 and 344 may be both operated wet as having pumps 333 and 343 both on, or one coil may be operated wet and one operated dry by having for example pump 333 on and pump 343 off, or both coil 335 and 344 can be operated dry by having pump 333 and 343 off. Note that wall 332 keeps water and air from migrating from side to side during operation. It should be noted that the number of sets of tight bend radius rows and large radius bends forming the spray water cooling zones is not a limitation of the invention.

Figure 11:
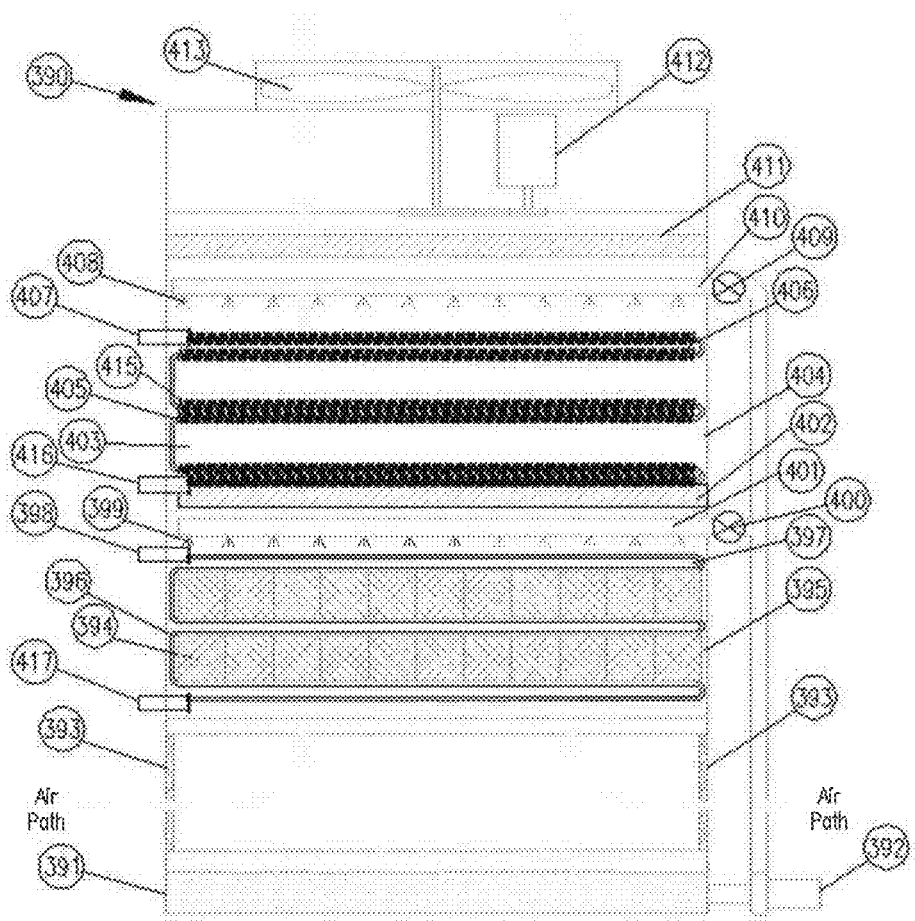
FIG. 11 is a side view of an eighth embodiment of two indirect heat exchangers with direct heat exchange sections and with secondary evaporative liquid distribution in accordance with the present invention.

Referring now to FIG. 11, a cooling tower in accordance with an eighth embodiment is shown at 390. The components in the eighth embodiment including cold water basin 391, pump 392, inlet louvers 393, top spray arrangement 410, nozzles or orifices 408, inlet header 407, outlet header 416, drift eliminators 411, motor 412 and fan 413 function the same as that presented in the first embodiment. Eighth embodiment 390 contains two indirect heat exchange sections. The top indirect section 405 has inlet out outlet headers 407 and 416 respectively, extended surface area fins 415, and can be seen with tight or normal return bends 406 and also large radius return bends 403 which form large spray water cooling zone 404. It should be noted that the two shown large spray water cooling zones 404 in top coil 405 may also have a direct section such as 394 installed if desired. The bottom indirect section 396 has inlet and outlet headers 398 and 417 respectively, and also tight or normal return bends 397 and large return bends forming large spray water cooling zone 395. Eighth embodiment 390 also contains secondary or intermediate spray header 401 with nozzles or orifices 399 to evenly spray coil 396 with spray water, drift eliminators 402, and selectively operated valves 409 and 400. It should be noted that instead of valves 409 and 400, two spray pumps may be used to accomplish the same desired modes of operation. In this eighth hybrid embodiment, there are five modes of operation. The first mode of operation is with spray pump 392 on, with valves 409 and 400 both open water is sprayed over the top of coil 405 and also onto coil 396. During mode one, the fan can operate at any speed desired or can be off. For the second mode of operation, pump 392 is on and valve 409 is open and valve 400 is closed. This allows less spray pump energy to be consumed and slightly less unit capacity when desired. During mode two, the fan can operate at any speed desired or can be off. For the third mode of operation, valve 409 is closed and valve 400 is open allowing only spray water to flow over the bottom indirect coil 396. In this hybrid mode, the bottom coil 396 operates in the evaporatively cooled mode while the top coil 405 above drift eliminators 402 operates dry. This mode of operation can serve to save water, abate plume or be used to desuperheat if desired. During mode three, the fan can operate at any speed desired or can be off. In a fourth mode of operation, valve 409 is closed and valve 400 is again open allowing only spray water to flow over the bottom coil 396 but this time the heat transfer to coil 396 is turned off such that there is no heat transfer between the tube runs in coil 396 and the spray water. Now the spray water along with direct section 394 operate to adiabatically cool the air that entered inlet louvers 393 to have the dry bulb temperature of the air approach the wet bulb temperature of the air. In this way, the operating top coil section 405 can operate in a sensible dry cooling mode while consuming much less water. During mode four, the fan can operate at any speed desired or can be off. The fifth mode of operation is with spray pump 392 off and the unit operates in the dry mode to sensibly cool the indirect heat exchangers 405 and 396.

Figure 12:
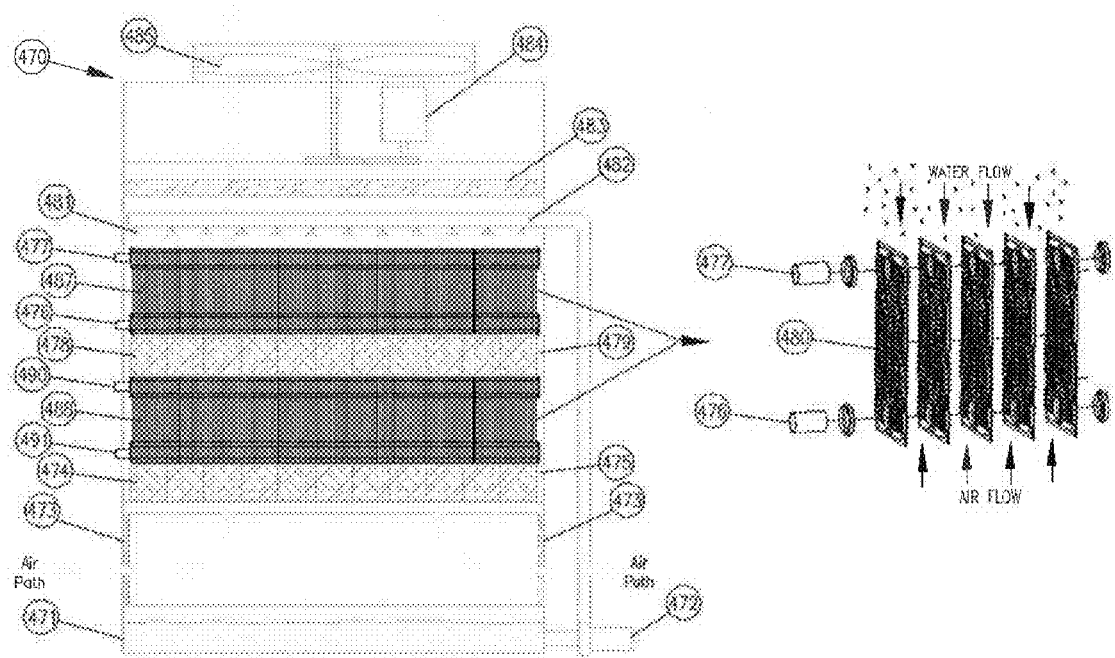
FIG. 12 is a side view of a ninth embodiment to two plate style indirect heat exchangers with two direct heat exchange sections in accordance with the present invention.

Referring now to FIG. 12, a closed circuit cooling tower or condenser in accordance with ninth embodiment is shown at 470. The components in the ninth embodiment including cold water basin 471, pump 472, inlet louvers 473, inlet header 477, outlet header 476, top spray arrangement 482, nozzles or orifices 481, drift eliminators 483, motor 484 and fan 485 function the same as that presented in the first embodiment. Ninth embodiment 470 utilizes at least two separate indirect heat exchange plate style heat exchangers shown as 487 and 488. Plate coil 487 and plate coil 488 may be piped in a series or in a parallel arrangement as is well known in the art. Plate coil 487 has inlet and outlet headers 477 and 476 respectively while plate coil 488 has inlet and outlet headers 490 and 491 respectively. Plate coil 487 and 488 are each shown with approximately forty eight sets of parallel plates 480 or cassettes where there are internal passages where the heat transfer fluid to be cooled or condensed travels and also external open channels between the sealed plates where the evaporative fluid, usually water flows generally downward and the air flow generally flows in a counter flow upwards motion. Plate coil heat exchangers 487 and 488 are separated by a large spray water cooling zone 479 and this zone has optionally a direct heat exchanger 478 installed within it. Below plate coil 488 another large spray water cooling zone 475 exists and has optionally a direct heat exchange section 474 within it. It should be understood that in all large spray water cooling zones 479 and 475 may have empty space for extra spray water cooling, an intermediate spray arrangement or direct heat exchange installed. It should be understood that plate coils 487 and 488 do not have large spray water cooling zones within them but the plate coils are separated by large spray water cooling zones. It should be noted that any number of plates, style of plates, material of plates, size of plates, pattern of the plates and height of the plates can be used and is not a limitation of the invention. It should also be noted that any height of spray water cooling zones greater than one inch can exist and are not limitations of the invention.

Figure 13:
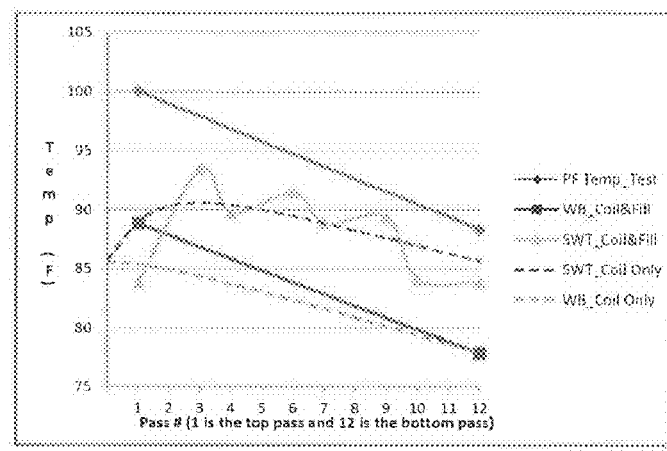
FIG. 13 is a chart of performance of heat exchangers constructed in accordance with the present invention.

FIG. 13 is a chart showing data from the prior art unit shown in FIG. 1 and the improved heat exchanger in the fourth embodiment employing indirect and direct sections. Specifically, the process fluid is represented in both prior art and the fourth embodiment by the top solid line (curve PF TempTest) showing the closed circuit cooling tower cooled the internal indirect coil fluid, in this case water, from 100 F to 88 F. It should be noted that in the prior art coil test, the top dotted line shows the spray water temperature at the top and bottom of the coil to be approximately 86 F while the maximum spray water temperature reached is approximately 91 F. However, note that with forth embodiment test data of the spray water temperature represented by the squiggly solid line, the spray water temperature at the top and bottom of the indirect coil section was 84 F and the maximum spray water temperature was 93 F. The improvement of the large spray water cooling zones can be seen as the spray water temperatures are both cooler displaying the ability to absorb more heat from the indirect tube runs yet overall the spray temperature was cooler as noted by the squiggly lines. The bottom two lines are the entering and leaving wet bulb temperatures. The bottom dotted line is from the prior art coil test showing the wet bulb entered at 78 F and left the unit at 89 F. The bottom solid line shows the wet bulb entering and leaving temperatures from test data from the fourth embodiment. Note that again the wet bulb entering temperature was 78 F yet the leaving wet bulb is higher than the prior art data leaving at 94 F. This increase in leaving wet bulb temperature shows the increased performance at identical operating test unit power draw (motors from both tests were both at 30 HP). In the fourth embodiment test data, because the spray water temperature profile is pushed up and the air wet bulb line (WB_Coil&Fill) is also pushed up, this allows air to have a larger enthalpy increase. So by adding direct sections to a prior art indirect coil only product, the efficiency gain from having large spray water cooling zones between the tube runs can be seen to be much more beneficial than a slight loss in airflow caused by adding the direct sections. With fill decks sandwiched between coil tubes, the efficiency of heat rejection is increased as the spray water picks up more sensible heat and transfers it to air in both latent and sensible fashions.

Figure 14:
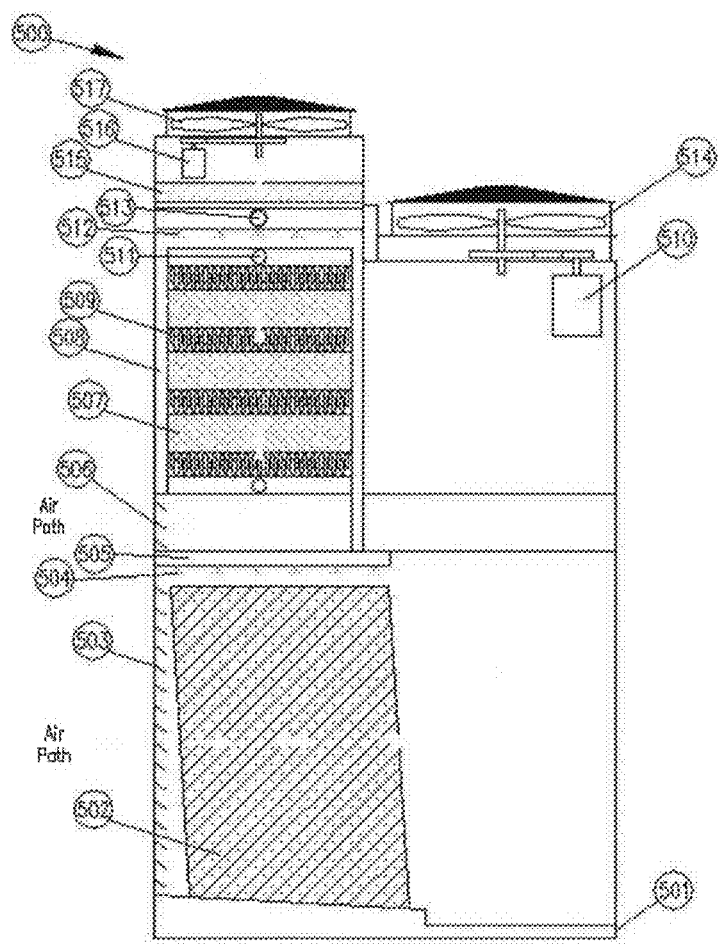
FIG. 14 is a end view of an embodiment of an indirect heat exchanger with direct heat exchange sections in accordance with the present invention.

Referring now to FIG. 14, a cooling tower in accordance with a tenth embodiment is shown at 500. In this embodiment fan motor 510 operates fan 514 to pull air through air inlet 503 then through direct heat exchanger 502 which serves to further cool spray water leaving indirect section 508. Spray water is pumped (pump not shown) from cold water basin 501 up through spray header pipe 513 making it through the spray header to be uniformly sprayed from nozzles or orifices 512 onto indirect heat exchanger 508. The heated spray water then makes it way from the indirect coil section with optional direct fill installed in the large spray water cooling zones to re-spray tray 505 which catches all the spray water and redistributes it uniformly from nozzle or orifices 504 to the direct fill section 502. Fan motor 516 runs fan 517 to induce air generally upwards through air opening 506, up through indirect section 508, through drift eliminators 515 and then is blown to the environment. The air inlet to the indirect section 508 may be of any height, may be one, two, or three sides and may have air blowing generally downward and is not a limitation of the invention. Indirect coil 508 is constructed with tight or normal return bends 509 then with larger return bends to create large spray water cooling zones as in the other embodiments. In this case, direct fill sections 507 are installed in the large spray water cooling zones to increase the efficiency of the heat transfer within the indirect coil section before the spray water leaves the indirect section to be further cooled in the direct section below it 502. Indirect heat exchanger coil header 511 may be inlet or outlet depending on the fluid to be used and is not a limitation of the invention. It is important to note that the tenth embodiment has exactly the indirect coil and direct fill sections within that coil from the fourth embodiment installed into a different style unit to show variations of how users in the art employ this technology.

Figure 15:
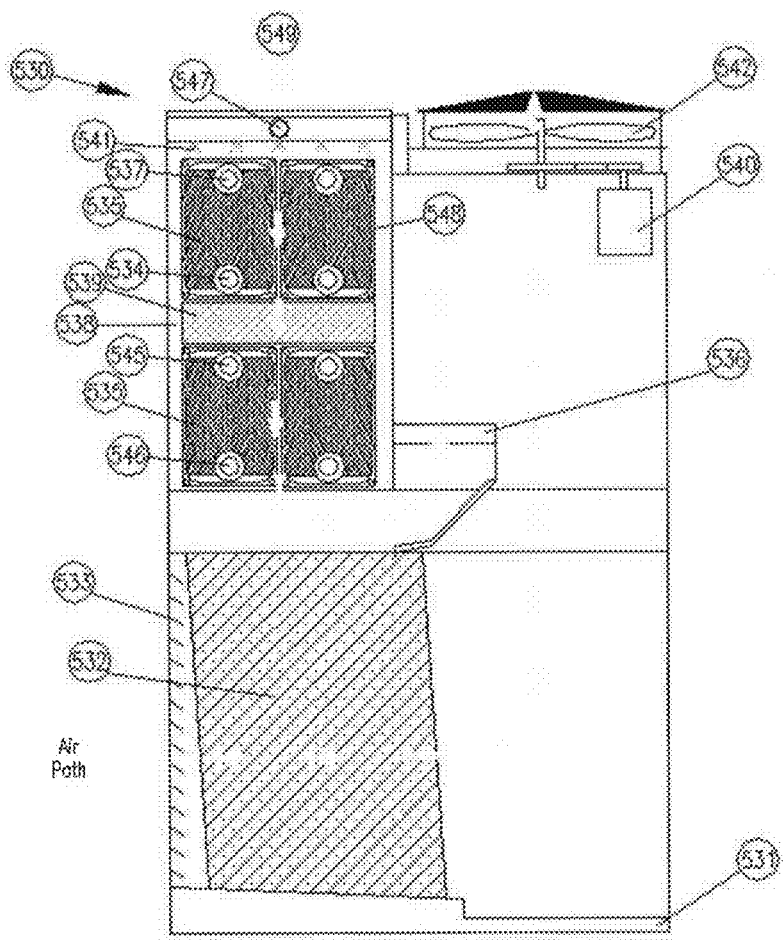
FIG. 15 is an end view of plate style indirect heat exchangers with direct heat exchange sections in accordance with the present invention.

Referring now to FIG. 15, a cooling tower in accordance with the eleventh embodiment is shown at 530. In this embodiment fan motor 540 operates fan 542 to pull air through air inlet louvers 533 then through direct heat exchanger 532 which serves to further cool spray water leaving indirect section 548. Air also enters the top of indirect section 548 at 549, travels generally downwards through indirect section 548 then through drift eliminators 536 and out of fan 542. Spray water is pumped (pump not shown) from cold water basin 531 up through spray header 543 into spray header 547 to be uniformly sprayed from nozzles or orifices 541 onto indirect heat exchanger 548. Indirect heat exchanger 548 is constructed with the plate coils 535 as presented in the ninth embodiment but can also be of the form presented in the tenth embodiment and is not a limitation of the invention. In this embodiment, there are at least two indirect heat exchanges separated by a large vertical water cooling zone 538 and direct fill section 539 is installed in the large spray water cooling zones to increase the efficiency of the heat transfer within the indirect coil section before the spray water leaves the indirect section to be further cooled in the direct section below it 532. Indirect heat exchanger coil headers 537 and 534 and indirect heat exchanger coil headers 545 and 546 may be piped in series or parallel and the inlet and outlets may be in any position that fits the application and is not a limitation of the invention. It is important to note that the eleventh embodiment has the indirect plate coil and direct fill sections from the ninth embodiment installed without the optional direct section installed beneath the bottom indirect plate coil section into a different style unit to show variations of how users in the art may employ this technology.

What is claimed is:

1. A method of exchanging heat comprising the steps of:
    providing a first indirect evaporative heat exchange section, the first indirect heat exchange section conducting a fluid stream within a plurality of pathways,
    the first indirect heat exchange section comprising a top and a bottom, providing a direct heat exchange section, the direct heat exchange section comprising a top and a bottom and a fill section, the direct heat exchange section being located under the first indirect heat exchange section,
    and providing a second indirect evaporative heat exchange section,
    the second indirect heat exchange section conducting a fluid stream within a plurality of pathways,
    the second indirect heat exchange section comprising a top and a bottom, the second indirect heat exchange section being located under the direct heat exchange section,
    distributing an evaporative liquid generally downward onto and through the first indirect heat exchange section such that indirect heat exchange occurs between the fluid stream within the plurality of pathways and the evaporative liquid,
    moving air through the first indirect section,
    the air moving through the first indirect heat exchange section exchanging heat with the evaporative liquid moving through the first indirect heat exchange section and hence indirectly exchanging heat with the fluid stream within the plurality of pathways in the first indirect section,
    distributing the evaporative liquid generally downward onto and through the direct heat exchange section such that direct heat exchange occurs between the fluid stream and air moving through the direct section,
    distributing the evaporative liquid generally downward onto and through the second indirect heat exchange section such that indirect heat exchange occurs between the fluid stream within the plurality of pathways and the evaporative liquid,
    moving air through the second indirect section,
    the air moving through the second indirect heat exchange section exchanging heat with the evaporative liquid moving through the second indirect heat exchange section and hence indirectly exchanging heat with the fluid stream within the plurality of pathways in the second indirect section,
    wherein the first indirect heat exchange section is comprised of a first series of serpentine coils and the second indirect heat exchange section is comprised of a second series of serpentine coils, and wherein
    a secondary system is provided to distribute the evaporative liquid downwardly and through the second indirect heat exchange section from a position above the top of the second indirect heat exchange section.

2. The method of exchanging heat of claim 1, further comprising:
    collecting substantially all of the evaporative liquid that exits the first indirect heat exchange section, the direct heat exchange section and the second indirect heat exchange section, and
    pumping the collected evaporative liquid upwardly such that it can be distributed generally downward onto and through the first indirect heat exchange section, the direct heat exchange section and the second heat exchange section.

3. The method of exchanging heat of claim 1 wherein the air moving through the first indirect heat exchange section moves generally counter-current to the direction of flow of the evaporative liquid through the first indirect heat exchange section.

4. The method of exchanging heat of claim 1 wherein the air moving through the first indirect heat exchange section moves generally cross-current to the direction of flow of the evaporative liquid through the first indirect heat exchange section.

5. The method of exchanging heat of claim 1, wherein the air moving through the direct section moves counter current to the generally downward evaporative liquid.

* * * * *